(12) United States Patent
Pridie

(10) Patent No.: US 7,883,657 B2
(45) Date of Patent: Feb. 8, 2011

(54) METHOD FOR JOINING AIRCRAFT COMPONENTS

(75) Inventor: Jago Pridie, Bristol (GB)

(73) Assignee: Airbus UK Limited, Bristol (GB)

( * ) Notice: Subject to any disclaimer, the term of this patent is extended or adjusted under 35 U.S.C. 154(b) by 1437 days.

(21) Appl. No.: 10/528,907

(22) PCT Filed: Sep. 25, 2003

(86) PCT No.: PCT/GB03/04183

§ 371 (c)(1),
(2), (4) Date: Mar. 23, 2005

(87) PCT Pub. No.: WO2004/028785

PCT Pub. Date: Apr. 8, 2004

(65) Prior Publication Data

US 2006/0162859 A1    Jul. 27, 2006

(30) Foreign Application Priority Data

Sep. 25, 2002    (GB) ............... 02222288.3

(51) Int. Cl.
*B29C 45/14* (2006.01)
*B29C 65/00* (2006.01)

(52) U.S. Cl. .............. 264/275; 264/238; 264/571; 264/265

(58) Field of Classification Search ............ None
See application file for complete search history.

(56) References Cited

U.S. PATENT DOCUMENTS

| 3,609,116 | A | 9/1971 | Thomas et al. |
| 4,861,643 | A | 8/1989 | Scollard |
| 5,316,462 | A | 5/1994 | Seemann |
| 5,722,300 | A | 3/1998 | Burkhard et al. |
| 5,885,513 | A | 3/1999 | Louderback et al. |
| 6,063,177 | A * | 5/2000 | Meda et al. ........ 106/38.25 |
| 6,558,503 | B1 | 5/2003 | Healey |
| 6,907,651 | B1 * | 6/2005 | Fisher et al. ........ 29/407.05 |

FOREIGN PATENT DOCUMENTS

| GB | 2 319 205 | 5/1998 |
| WO | WO 01/19936 A1 | 3/2001 |

* cited by examiner

*Primary Examiner*—Edmund H. Lee
(74) *Attorney, Agent, or Firm*—Patterson Thuente Christensen Pedersen, P.A

(57) ABSTRACT

The surface of a moulding tool, for receiving a first aircraft component, for example a spar, is shaped to correspond to the surface of a second aircraft component, for example a wing skin. A gap is defined between the tool and the first component. Resin is drawn into the gap by a suction pump. The resin fills the gap and cures to form a shim. The first and second components, which are in the form of composite material structures, are then joined together without any significant voids being formed therebetween.

16 Claims, 13 Drawing Sheets

METHOD FOR JOINING AIRCRAFT COMPONENTS

FIELD OF THE INVENTION

The present invention relates to a method of joining two aircraft components and in particular to a method of enabling two aircraft components to be joined together, wherein the surfaces of the aircraft components to be joined together are so shaped that a gap is defined therebetween and the method includes producing a shim so that the gap may be substantially filled.

BACKGROUND OF THE INVENTION

When manufacturing aircraft structures, such as for example wings, it is necessary to join one aircraft component to another. It is often the case that aircraft components are manufactured in such a way that when joining two components a shim is needed to fill a gap between the components. The use of a shim when joining components together is common, for example, when joining composite material aircraft structures such as spars and wing skins, owing to difficulties in manufacturing large composite parts accurately to a predefined shape. Generally, after a composite component has been moulded to a particular shape, the component changes shape due to effects such as the shrinkage of the resin matrix and other material effects in view of the temperatures of different regions of the material in the mould and in view of the different fibre lay-up directions employed. Such a change in shape is generally referred to as "spring back". Predicting accurately how much a component will spring back after moulding is difficult, if not impossible. It is therefore difficult for component manufacturers to assemble composite components to the tight tolerances required for efficient aircraft production and operation. It may therefore be accepted that such components will spring back, and that the components to be joined together will not, without employing further means, fit together exactly (or close enough to be within acceptable tolerances). Thus, such components may be manufactured such that there will be a gap, albeit small, between adjacent components that is filled during assembly by means of a shim.

Shims have, to date, been produced by various techniques including machining a solid shim from a separate piece of metal material (such as a piece of aluminium). Solid shims are machined and fettled to fit in the gap and then sealant is used to fix the shim in the gap. Such machining/fettling is time consuming and requires a skilled operator.

Shims have also been produced with the use of sealant without employing any metal pieces. Forming a shim with sealant may be effected by coating either or both surfaces to be joined with sealant, then bringing the surfaces together so that the sealant is squeezed between the components and out from between the components, thereby filling the gap with sealant. Excess sealant squeezed out of the gap is then wiped away. Joining one component to the other using sealant in this way can lead to voids being present between the two components, where insufficient sealant has been provided. Also, filling gaps with sealant in such a way can be inefficient and can even reduce the effectiveness of the join between the two components.

SUMMARY OF THE INVENTION

It is an object of the present invention to provide a method and an apparatus which enables two aircraft components to be joined together which avoids or mitigates one or more disadvantages associated with the above described prior art.

According to the present invention there is provided a method of enabling two aircraft components to be joined together, the method including the steps of providing a first aircraft component having a surface to be joined to a corresponding surface of a second aircraft component, the first and second components being so shaped that if joined there would be a gap defined between said surfaces of the first and second components, providing a resin infusion system comprising a source of resin, effecting flow of the resin from the source of resin into the gap by means of suction, thereby substantially filling the gap with resin, and curing the resin. A shim may thereby be formed.

Thus, during performance of the method of the present invention resin is caused to flow into and to fill substantially the entire gap, thereby reducing the chance of there being a void in the shim so formed that might affect the structural integrity of the join, once the second aircraft component is joined to the first aircraft component. The method may also be of particular advantage in that when the components are assembled no shimming need take place on the production line.

The method is preferably so performed that the resin is cured on the first aircraft component.

The method is of particular advantage when the gap has at least one region having a thickness of greater than 0.2 mm. The gap may have a thickness, over at least 95% of the area of the gap, of less than 3 mm. Preferably, the gap has a maximum thickness of less than 3 mm. The gap may have a varying thickness, such that the thickness might vary within a range of between 0 mm and 3 mm. For example, the gap may have both regions having a thickness of less than 0.7 mm and regions having a thickness of greater than 0.7 mm. The gap may be so shaped that it has at least one region having a thickness of less than 0.5 mm and at least one region having a thickness of greater than 1.0 mm.

The flow of the resin out of the gap is advantageously restricted by means of a barrier. The barrier may for example be placed such that a surface of the barrier is positioned along at least a part of the boundary of the gap. The barrier may be in the form of a part of the second aircraft component. Alternatively, the barrier may be distinct from the second aircraft component.

At least a part of the barrier is advantageously formed by a surface of the resin infusion system. The surface of the resin infusion system that forms the barrier (or part thereof) may for example be in the form of a part of a moulding tool that forms a part of the resin infusion system. The surface of the barrier that faces the surface of the first component is preferably shaped to correspond to said surface of the second aircraft component.

The barrier is, during the filling of the gap with resin, preferably removably, for example temporarily, fixed in position relative to the first aircraft component. Even in the case where the barrier is formed by the second component, the first and second components are preferably removably fixed, so that, for example, after the shim is formed the first and second components may be separated to allow subsequent assembly of the components to each other and in relation to other components. A surface of the first or second aircraft component may be prepared so that the adherence of the resin to the surface is improved. A surface of the first or second component may be prepared so that the adherence of the resin to the surface is reduced, to facilitate later separation of the surface from the cured resin. The surface may be roughened by, for example, grit blasting, to improve its bonding properties. The surface may be smoothed, for example by applying a coating such as, for example, a release agent, to reduce its bonding properties. Whilst it is preferred that the resin once cured bonds to the first component, and the first component together with the cured resin, on the one hand, and the second component, on the other hand, are only fixed together during final assembly, it is within the scope of the present invention both for the cured resin to be releasable from both the first and second components and for the resin to be bonded to both the first and second components immediately after curing of the resin.

The process may thus also be used to bond surfaces together; in that case, each surface may be prepared so that the adherence of the resin to the surface is improved; thus a surface of the first aircraft component and a surface of the second aircraft component may be so prepared.

In the case where the barrier is a surface defined by the resin infusion system, the first aircraft component may be removably, for example temporarily, fixed in position relative to the resin infusion system. The resin infusion system may include a locating element that engages with a corresponding element on the first aircraft component. The barrier may include a locating element that engages with a corresponding element on the first aircraft component. Such a locating element may assist in fixing the first aircraft component in the desired position relative to the barrier. The method may include a step of machining, or otherwise forming, a hole in the first aircraft component, the hole being configured to receive the locating element. There may be more than one locating element. Preferably there are at least two locating elements. The second aircraft component may include one or more holes. Such holes may aid alignment of the first and second aircraft components. The first and/or second aircraft components may also include one or more locating elements. One or more locating elements may alternatively or additionally be provided separately.

The barrier is preferably fixed to the first aircraft component by means of a pressure difference. A vacuum pump may for example be used to cause the pressure difference. A vacuum pump may be used to provide the suction that draws the resin into the gap. Advantageously, a single vacuum pump is used both to cause the pressure difference that fixes the barrier to the first aircraft component and to provide the suction that draws the resin into the gap. The single vacuum pump may however be viewed as being the only common part of two distinct suction systems.

A filter is preferably provided to hinder, or preferably substantially restrict, flow of the resin out of the gap. The filter is for example placed at the boundary of the gap and the source of suction and allows air to be drawn from the gap, whereas the flow of resin through the filter is hindered. Preferably the filter is so configured that during performance of the method less than 1% of the resin introduced into the gap escapes out of the gap via the filter.

The resin infusion system preferably includes a plurality of resin ports, through which resin passes and then into the gap. The plurality of resin ports may for example be in the form of outlets, holes, passages, channels or the like. The plurality of resin ports may be provided along the length of a conduit. For example, in the embodiment of the invention described below with reference to the drawings, a coiled spring is provided that in use is sealed along its length around a section of its circumference so that it acts as a pipe with a series of ports, in the form of apertures, along its length. A toothed belt may alternatively or additionally form part of the structure defining the resin ports.

Preferably, the resin infusion system includes a plurality of suction ports to which the suction is applied. The plurality of suction ports may for example be in the form of holes, passages, channels, suction inlets or the like. The suction ports may be formed in the first aircraft component. The suction ports may alternatively or additionally be formed in a barrier (for example the barrier mentioned above) or another component, such as the second aircraft component, for example.

The first aircraft component may include at least one aperture arranged so that the suction is provided via said at least one aperture. For example, in the embodiment of the invention described below with reference to the drawings, the first aircraft component is in the form of a wing spar and ports are provided as holes in the spar that pass from one surface of the spar to an opposite surface of the spar. Such holes may for example perform at least one other purpose. For example, in the embodiment described below the holes are in the form of pilot holes that are present in the spar for the purpose of fixing ribs to the spar. Advantageously, substantially all apertures or holes in the first component that are used in the method perform another purpose or function. The method may therefore be performed without needing to machine any holes other than those that would in any case have been machined.

The curing of the resin is conveniently effected by a cold curing technique. Whilst possible, the resin is preferably not heated prior to being drawn into the gap. The resin may be allowed to cure at a temperature below 40 degrees Centigrade, preferably at a temperature between 0 and 30 degrees Centigrade. Preferably the resin is cured at, or close to, room temperature.

The method is preferably so performed that the difference in pressure between the source of suction and the source of resin is less than 2 bar. Preferably the pressure difference is less than 1.5 bar. More preferably the pressure difference is 1 bar or less. The pressure difference is preferably at least 0.1 bar. The resin may be supplied at a pressure substantially equal to atmospheric pressure. It may be advantageous, for example depending on the choice of resin, for the resin to be supplied at a pressure above atmospheric pressure. The aforementioned pressure differences are preferably maintained for at least the majority of the duration of the step of filling the gap with resin and more preferably for at least 90% of the duration of that step.

The method may include a step of reducing the suction applied, but maintaining a pressure gradient. Such a step is preferably performed after the resin has substantially filled the gap. Thus the first component, if deformed by means of the pressure difference applied during the filling of the gap with resin, may relax and conform substantially to its original shape.

The method may include a step of placing solid material in the gap before effecting flow of the resin into the gap. For example, if the gap has regions of a certain thickness of greater than, say, 0.7 mm, it may be beneficial for the resin in such regions to be strengthened by means of solid material. The solid material preferably comprises fibres. The solid material may for example be in the form of a dry woven cloth, for example a carbon fibre cloth or a glass fibre cloth. The method preferably includes a step of assessing which regions of the gap have a thickness greater than a predetermined threshold thickness. Solid material may thereafter be placed in the regions so identified. The predetermined threshold thickness is preferably within the range of 0.6 mm to 1 mm.

The resin is preferably a relatively low viscosity resin. Preferably, the resin has a viscosity of less than 1000 centipoises and more preferably of less than 800 centipoises. The resin may for example have a viscosity in the range of 400 to 750 centipoises.

Higher viscosity resins may be used, in alterative embodiments of the invention; the necessary pressure gradient may be provided by applying a sufficiently high pressure at a resin inlet and a relatively low pressure (preferably a vacuum) at a resin outlet.

The method has particular application when at least one of the aircraft components to be joined are formed of a composite material. Thus the first and/or the second aircraft components may be formed of a composite material.

The method may further include a step of joining the second aircraft component to the first aircraft component, for example during final assembly of the components. In an embodiment of the invention described below with reference to the drawings, the first aircraft component, in the form of a wing spar, is mounted on a moulding tool during the step of filling the gap with resin. In such a case, the first aircraft component would of course be removed from the moulding tool together with the cured resin before joining the first and second aircraft components. In another embodiment the first and second components are placed together as if being joined, a shim is formed therebetween, the first component and shim are then separated from the second component, and then the components are finally assembled. Sealant may be used when bonding the first component and shim to the second component.

Preferably, one of the first and second components is a spar, or part thereof. Preferably, one of the first and second components is a wing skin, or part thereof. For example, the first aircraft component may be a wing spar and the second aircraft component may be a portion of wing skin. In an embodiment described below the first aircraft component is a cover (a portion of the wing skin) and the second aircraft component is a spar, the surfaces to be joined being defined by a flange of the spar and a portion of the cover.

The aircraft components to be joined and the way in which the method is performed may be such that the resin once cured can be considered as being in the form of a shim. In such cases, the method may be viewed as being a method of forming a shim.

The invention also provides a method of preparing a first aircraft component before final assembly of the first aircraft component with a second aircraft component, the method including the step of forming a shim by a vacuum resin infusion technique, the shim so formed enabling the gap that would otherwise be defined between the first and second aircraft components when finally assembled to be reduced. The invention also provides a method or preparing an aircraft component before joining the component to another component, the method including the steps of providing a first aircraft component and a shim tool having a surface shaped to correspond to the surface of a second aircraft component to which the first component is to be joined, arranging the surface of the shim tool and the first aircraft component against each other, thereby forming a gap between the tool and the component, and causing the shim tool to fill the gap with a shim produced by a vacuum resin infusion technique. Features described above in relation to the invention may of course be incorporated into these aspects of the invention. The invention also provides shim forming apparatus including a jig for receiving and positioning a first aircraft component relative to a second aircraft component, the apparatus further including a resin infusion system including a suction pump and a source of resin, the apparatus being so arranged that in use a gap defined between the surface of the second aircraft component and the first aircraft component may be filled with resin to form a shim.

The invention yet further provides a shim forming apparatus including a moulding tool having a surface shaped to receive a first aircraft component such that a gap is present between the surface of the moulding tool and the first aircraft component, the surface of the moulding tool being shaped to correspond to the surface of a second aircraft component, the apparatus further including a resin infusion system including a suction pump and a source of resin, the apparatus being so arranged that in use the gap between the surface of the moulding tool and the first aircraft component may be filled with resin to form a shim.

The moulding tool may have a portion that in use is able to sealingly engage with a portion of the first aircraft component, to define a sealed region, which is connectable to a suction pump so that in use suction may be applied to the region, thereby holding the first aircraft component in a fixed position relative to the moulding tool. The apparatus may further include a vacuum bag that is attachable to the moulding tool and which, in use, enables suction to be applied to the moulding tool to draw resin from the resin source into the gap.

The invention also provides a moulding tool suitable for use in a shim forming apparatus, the moulding tool having a surface shaped to receive a first aircraft component such that a gap is present between the surface of the moulding tool and the first aircraft component, the surface of the moulding tool being shaped to correspond to the surface of a second aircraft component, the moulding tool being so configured that it may be arranged so that a gap formed between the surface of the moulding tool and such a first aircraft component may be filled with resin to form a shim.

The invention further provides an aircraft component and shim as produced by the method or apparatus of the invention. There is also provided an aircraft structure including a first aircraft component connected to a second aircraft component, there being a shim interposed between the first and second components the shim being produced by the method or apparatus of the invention. There is yet further provided an aircraft including such an aircraft structure.

Of course, it will be appreciated that features described in relation to one aspect of the present invention may be incorporated into other different aspects of the invention. For example, the method of the invention may be performed with the shim forming apparatus or moulding tool of the invention. Also, the shim forming apparatus or moulding tool of the invention may be arranged or configured to be suitable for use in the method of the invention.

BRIEF DESCRIPTION OF THE DRAWINGS

By way of example embodiments of the invention will now be described with reference to the accompanying schematic drawings, of which:

FIG. 2a is a cross sectional view of a wing of the aircraft shown in FIG. 1,

FIG. 2b shows a magnified view of a part of FIG. 2a,

DETAIL DESCRIPTION OF THE PREFERRED EMBODIMENTS

Figure 1:
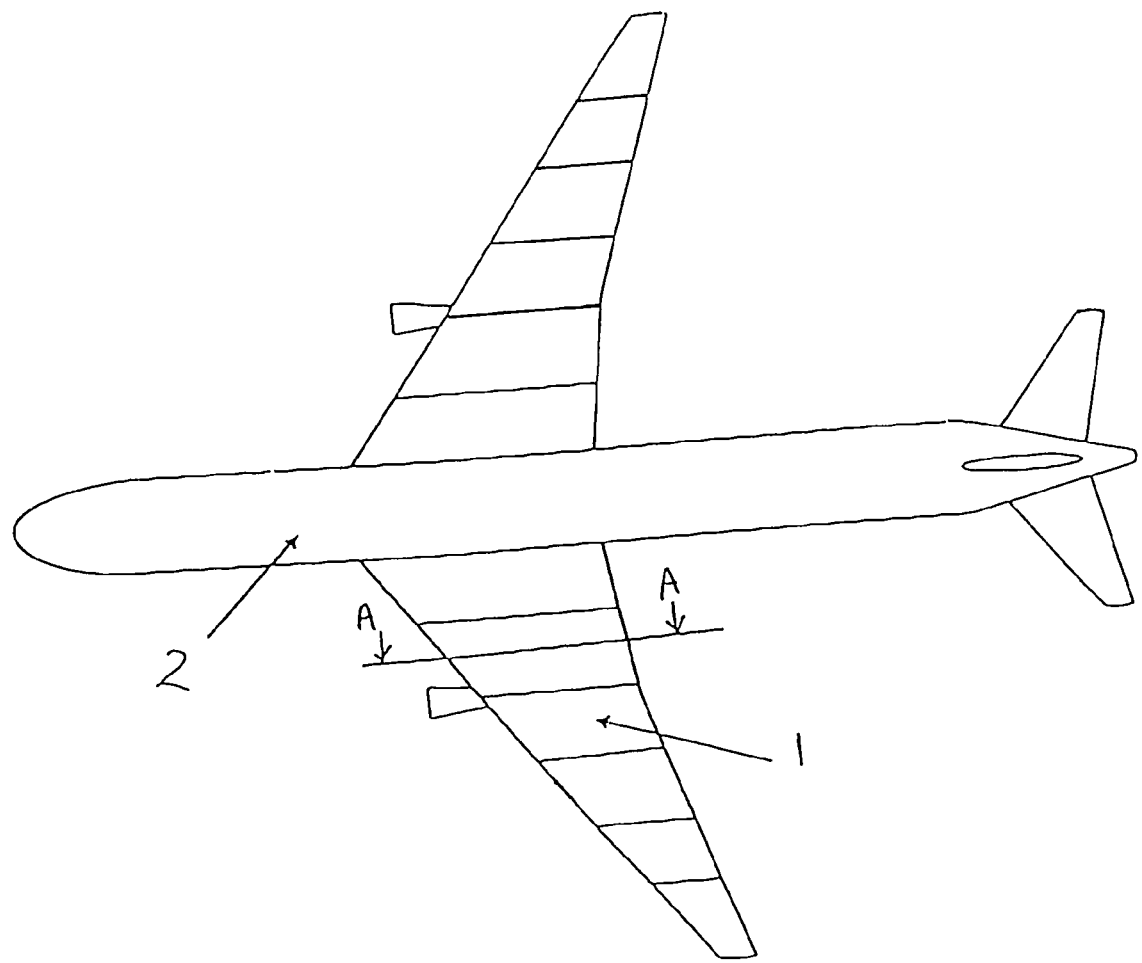
FIG. 1 is a plan view of an aircraft.
Figure 2:
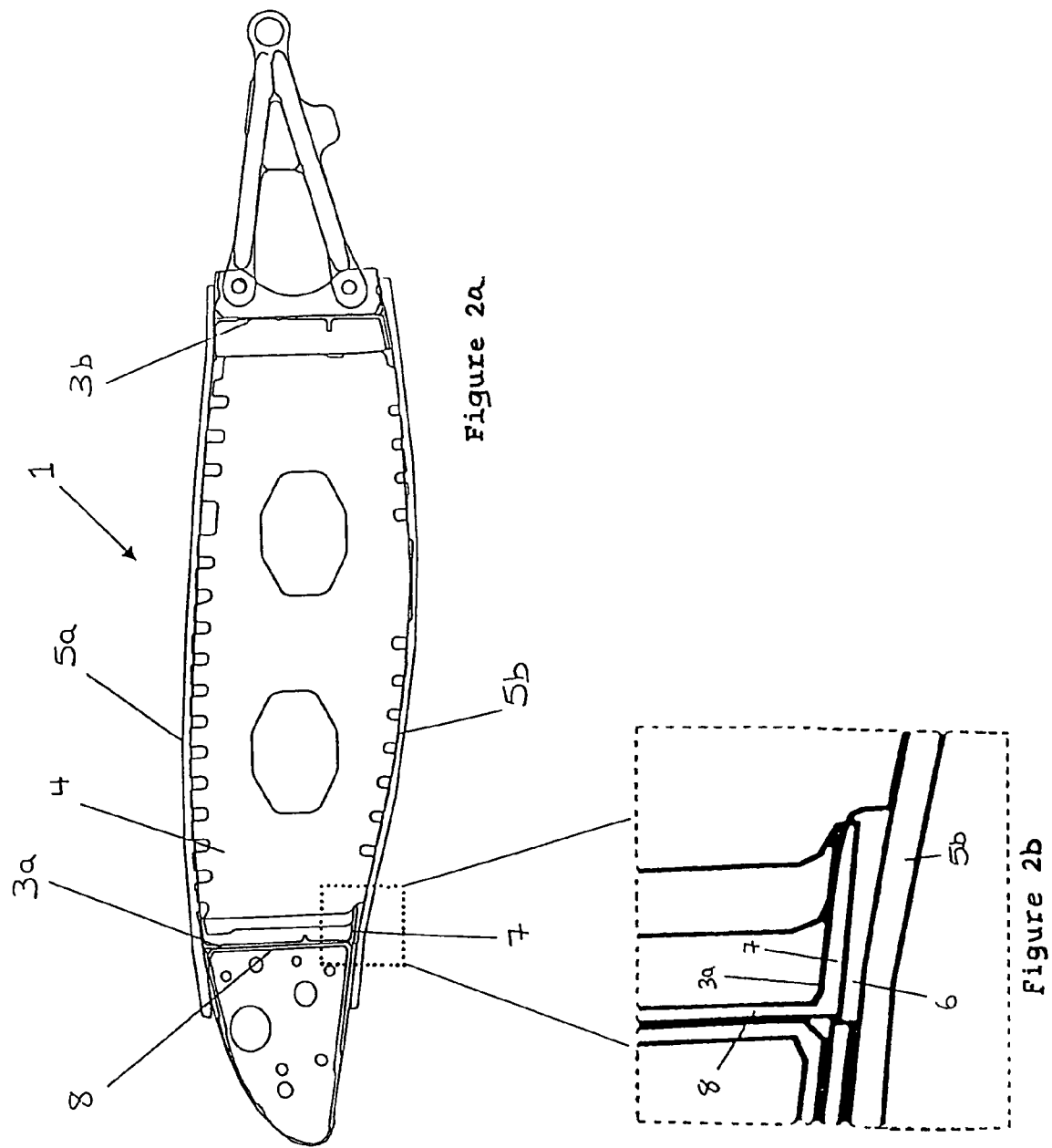

FIG. 2a shows a cross section taken along the line A-A of the wing 1 of the aircraft 2 shown in FIG. 1. The wing 1 comprises a front wing spar 3a and a rear wing spar 3b that run along the leading and trailing edges of the wing 1. The spars 3 are generally C-shaped in cross section. Ribs 4 are attached to and between the spars 3a, 3b. Attached to the spars 3a, 3b and the ribs 4 are the upper wing skin 5a and lower wing skin 5b.

The spars 3a, 3b and wing skins 5a, 5b are each formed from composite carbon fibre and matrix materials.

FIG. 2b shows a magnified view of a portion of FIG. 2a in the region of the interface between the front wing spar 3a and the lower wing skin 5b. Owing to the manufacture and assembly process and in particular due to the change in shape of the spar after demoulding (known as "springback"), a gap is present between the spar 3a and the wing skin 5b. This gap is filled by a shim 6. The shim 6 is formed in the gap between the spar 3 and the tool 9 by means of a resin vacuum infusion process.

Figure 3:
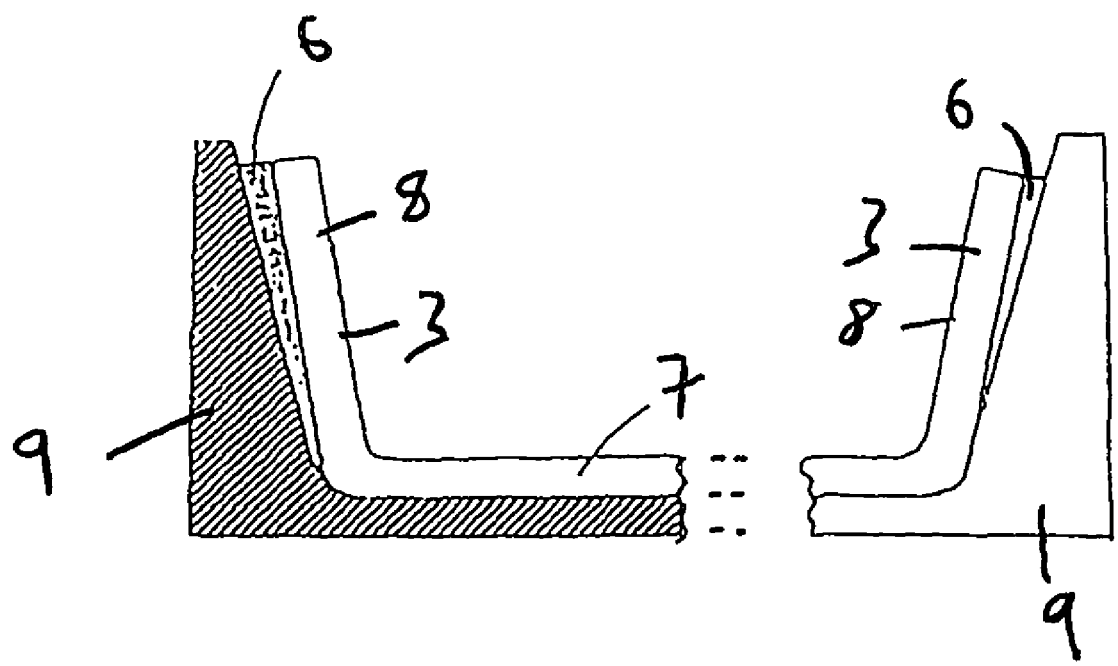
FIG. 3 is a partial cross sectional view showing a spar, a tool according to a first embodiment and a shim formed therebetween.

FIG. 3 shows a cross section of a part of a tool 9 for making such a shim 6.

With reference to FIG. 3, the C-shaped cross section of the spar is defined by two flanges 8, between which there extends the spar web 7, the flanges 8 each extending from the web 7 in a direction that is approximately transverse to the web 7.

In this first embodiment illustrated by FIGS. 1 to 7, the rear spar 3b is 11.5 metres long and at the root end has a web depth of 250 mm, a flange height of 150 mm and a laminate thickness of 15 mm. The corresponding dimensions at the tip end of the spare, are a depth of 150 mm, a flange height of 45 mm and a laminate thickness of 6 mm.

The shim 6 extends along the majority of the length of the spar and has a width that varies between 0 and about 1.5 mm, a height that varies between about 40 mm and about 150 mm and a length of about 11.5 m.

The outer surface of the tool 9 that opposes the surface of the flange 8 of the spar 3 is shaped to correspond to the surface of the wing skin 5 to which the spar 3 is to be attached.

Figure 4:
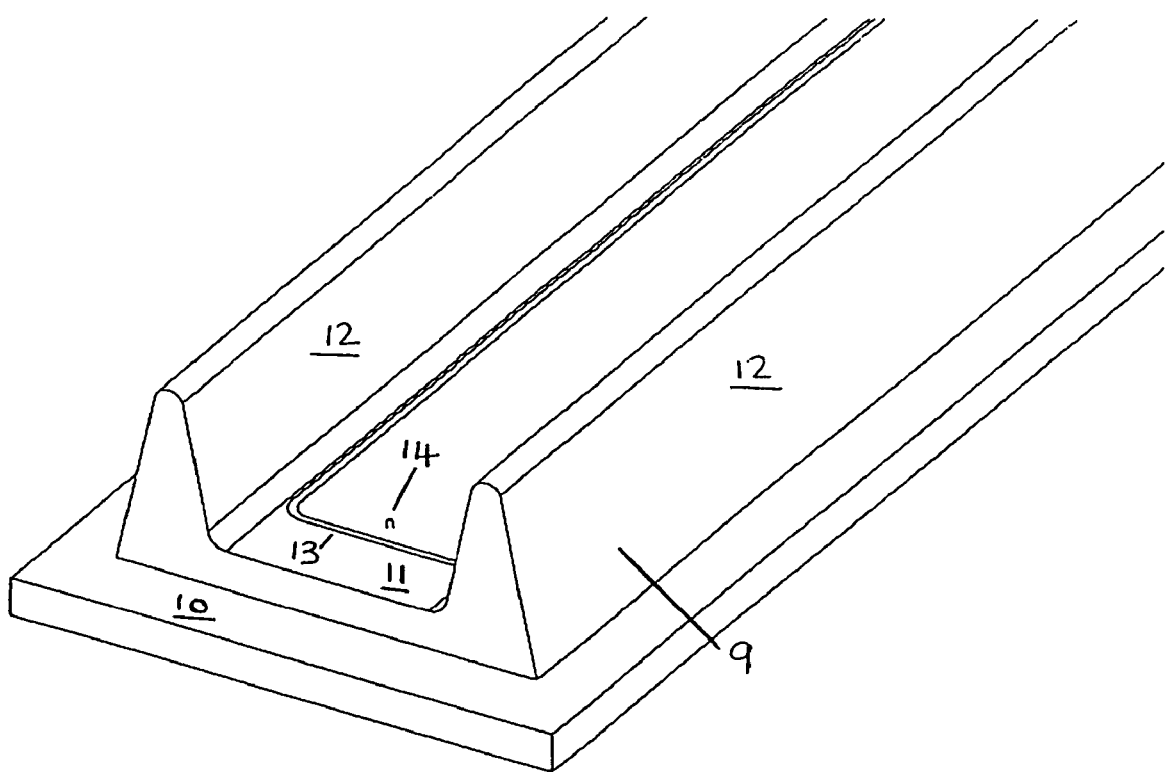
FIG. 4 shows a partial perspective view of the tool shown in FIG. 3 without a spar.

FIG. 4 shows the main parts of the tool 9 in perspective. The tool 9, made from polyurethane material, is mounted on a steel support base 10. In the first embodiment the tool is made from CIBATOOL (RTM) BM5460 polyurethane block available from Vantico Limited (UK), although other suitable materials such as epoxy materials could be used. The tool 9 is of a shape suitable to receive a spar 3 (not shown in FIG. 4).

Thus the tool 9 has a base 11 and side portions 12 extending upwardly from the base such that the web 7 of the spar sits on the base 11. The flanges 8 of the spar extend upwardly and in the same general direction as the inner surfaces of the side portions 12, a small gap being defined between them and the spar, in which gap the shim 6 is to be formed. The base 11 has a rebate 13 formed therein in which foam sealant tape is accommodated. The tool 9 also includes two locating pins 14, one provided at each end on the base 11 of the tool 9.

Figure 5:
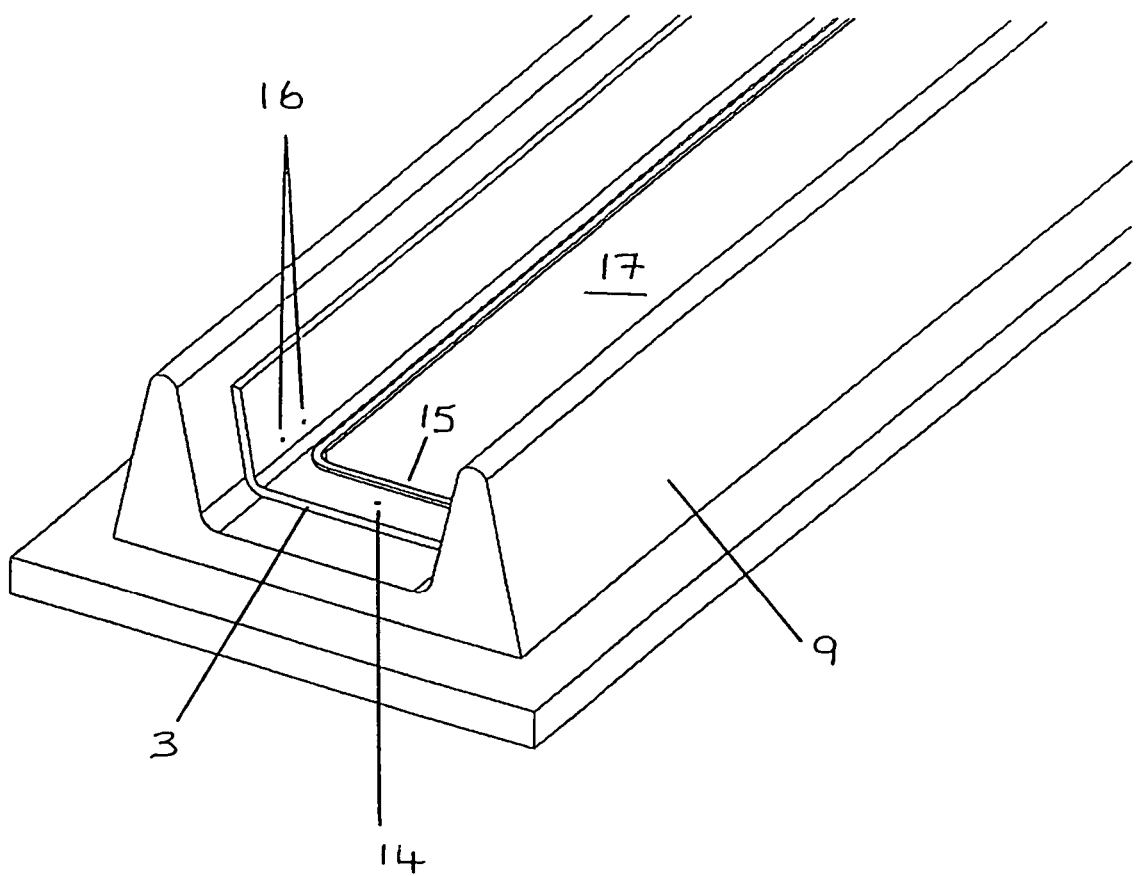
FIG. 5 shows a perspective view of the tool shown in FIG. 3 with a spar on the tool.

FIG. 5 shows a spar 3 positioned on the tool 9. The spar 3 has two holes in which the locating pins 14 are accommodated, so that the spar 3 is correctly positioned on the tool 9. The spar 3 has further holes (not shown in FIG. 5) in the web 7 of the spar 3 that provide fluid communication between the underneath of the spar in the region defined by the sealant tape in the rebate 13 and the uppermost side of the spar 3. Bag tape 15 (such as GS-100 bag tape, available from Airtech International, Inc) is provided around and encompasses those holes. The spar 3 has further pilot holes 16 machined along its length in each flange 8 of the spar 3, only two pilot holes being shown in FIG. 5. When a wing is assembled, ribs are attached to the spar 3 via the pilot holes 16 by means of rivets, bolts or the like.

Figure 6:
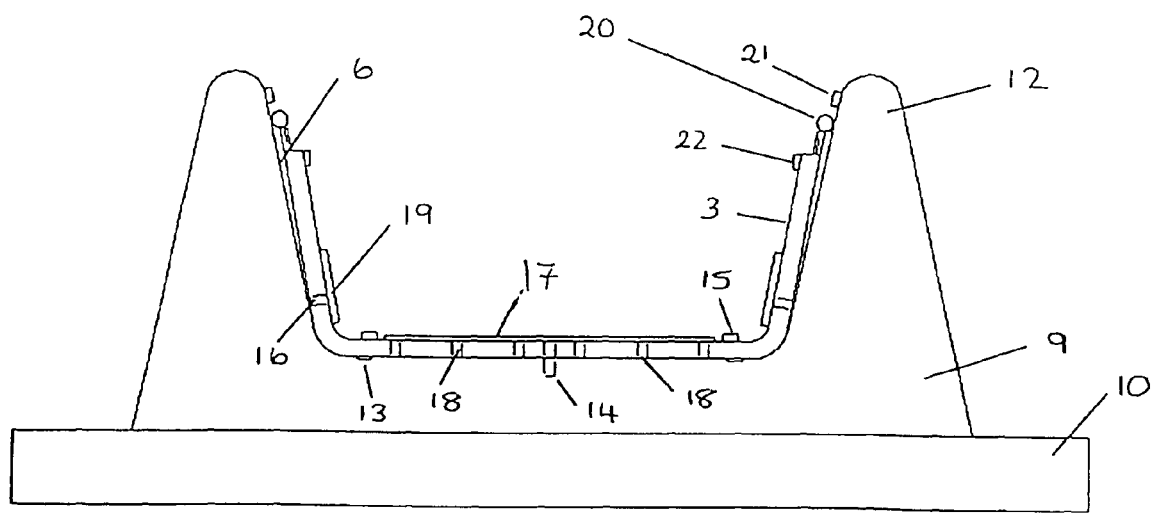
FIG. 6 shows a cross section of the tool and spar.

FIG. 6 shows a cross section of the spar 3 and tool 9 shown in FIG. 5 and additionally shows various other features/components omitted (for the sake of clarity) from FIG. 5. FIG. 6 shows the holes 18 provided in the web 7 of the spar 3 that are encompassed by the bag tape 15. Over the holes 18 there is placed a breather mat 17 (such as an Airweave N-10 breather from Airtech International Inc). FIG. 6 additionally shows brakes 19 placed along the length of the spar and over the pilot holes 16, the brakes 19 being in the form of a strip of carbon fibre (dry fibre). Resin inlets, in the form of coil springs 20 which act as pipes, are provided on the top of each of the flanges 8 of the spar 3. The coils of the springs are spaced apart so that in use resin may flow out of the spring through the gaps between adjacent coils. (The resin inlets could of course equally be referred to as resin outlets, since resin is in use caused to flow out of the coils of the spring.) Bag tape 21 passes along the length of the top of the interior surface of the side portion 12 of the tool 9. Bag tape 22 also passes along the top of the interior surface of the flange 8 of the spar 3.

A shim 6 is formed in the gap between the side portions 12 of the tool and the flanges 8 of the spar 3 by means of a process that will now be described with reference to FIGS. 5, 6 and 7 of the drawings.

Figure 7:
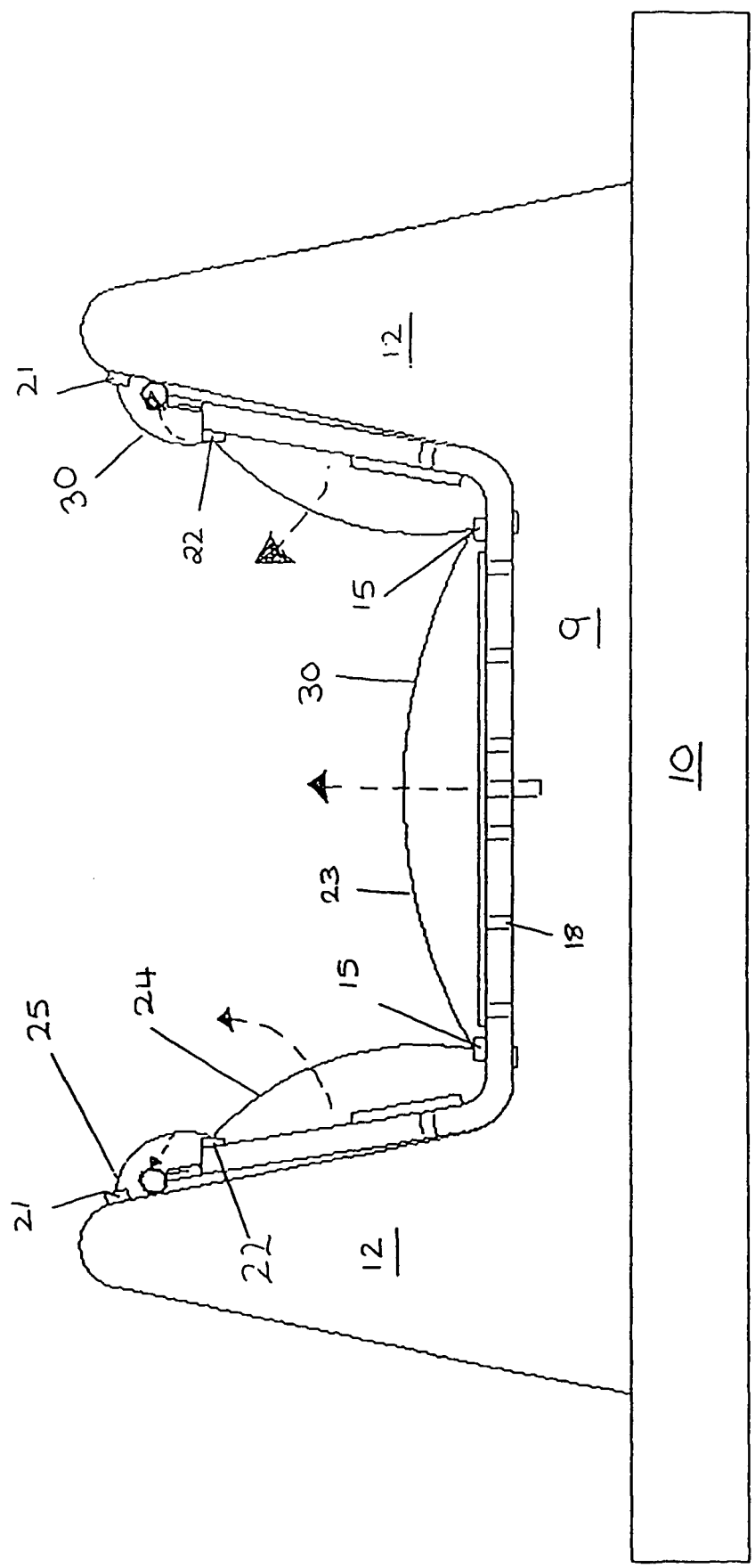
FIG. 7 shows a cross section of the tool and spar during operation of the tool.

FIG. 7 shows schematically the function of a vacuum bag 30 and the direction of the flow of fluids in the system. As a first step, surfaces of the spar 3 are suitably prepared and the various holes are machined in the spar, for example, by drilling. The spar is then placed on the tool such that the locating pins 14 are received in the appropriate holes in the web 7 of the spar 3. The bag tape 15 is then applied around the holes 18 in the web of the spar 3. A breather mat 17 is then placed over the holes 18. The vacuum bag 30, attached to a vacuum pump (not shown), is attached to the bag tape 15, the relevant sealed section of the bag being represented in FIG. 7 by the reference numeral 23. The pump is operated to draw air from the bag and spar arrangement thereby drawing the web 7 of the spar 3 on to the tool 9 by virtue of the negative pressure caused between the spar 3 and the tool 9 in the region sealed by the seal in the rebate 13. The breather mat 17 prevents the vacuum bag from sealing over the holes 18, which would prevent air from being drawn from the sealed region beneath the spar web 7.

A pressure drop test is then performed to test the integrity of the seal between the spar and tool. If the vacuum pressure drop test is successful then brakes 19 are installed over holes 16 and the bag 30 is attached to the bag tapes 21 and 22 on the flange 8 and the spar 3, respectively, these sections of the bag being represented in FIG. 7 by the reference numerals 24 and 25.

The purpose of the section 25 of bag 30 over the resin inlets 20 is to prevent resin from "fast tracking" from the inlet 20 via an undesired route to the vacuum pump. The bag 30 is thus temporarily sealed on all sides to the tool 9 by means of the bag tape.

After the bag 30 has been attached to the flanges 8 of the spar 3, to form sections 24, 25, a further vacuum pressure drop test is performed. If that pressure drop test is successful, then the resin inlets are opened so that resin including a hardening agent may flow from a resin source (not shown), via the inlet pipes 20, into the gap between the side portions 12 of the tool 9 and the flanges 7 of the spar 3.

Suction is then applied to the bag 30 such that the bag 30 is drawn flat against the surface of the spar 3. For example, sections 25 of the bag 30 seal over spring 20, which has the effect both of converting spring 30 into an arrangement similar to a pipe with an open side and of preventing resin from flowing over the spar 3 as opposed to flowing into the gap between the spar 3 and the tool 9.

Resin is drawn from the inlets 20 into the gap between the flanges 8 of the spar 3 and the tool 9 and towards the outlet holes 16. The resin enters the inlet 20 at one end of the spar 3 and the suction provided by the vacuum pump is applied at the other end of the spar 3 in the region of the boundary between the flange 8 and web 7 of the spar. The resin is consequently drawn from one end of the spar to the diagonally opposite end. The flow of the resin is such that the resin generally flows down from the inlet pipe 20 to the nearest pilot hole 16 opposite and below the resin in the pipe 20. The resin progresses gradually along the length of the spar filling successive pilot holes 16, thereby gradually filling the gap. Resin is prevented from exiting the outlet holes 16 by means of the brakes 19. The vacuum pump that causes the resin to be drawn into the gap between the spar 3 and the tool 9 is operated until resin is witnessed in the brake 19 above each of the outlet holes 16. After the gap has been completely filled with resin, the vacuum pump is operated to increase the pressure from close to zero bar to about 0.2 bar, which allows the spar flanges 8 to relax gradually. The vacuum pump is, after a suitable length of time, switched off completely. The resin is then allowed to cure at room temperature for 24 hours. The cured resin thus forms a shim.

The resin used in the above described embodiment is a low viscosity resin that cures at room temperature and is able to flow freely under a relatively low pressure gradient (pressure differences of 1 bar at the very maximum) such as LY5052/HY5052 (an epoxy resin and hardener available from Vantico Limited).

After the resin has cured, the vacuum bag 30 is removed and the spar 3 and shim 6 are removed from the tool 9. The spar 3 and shim 6 may then be used in standard assembly techniques to form part of a wing skin, a wing skin being attached to the flange 8 of the spar 3 via the shim 6 with standard joining techniques.

Figure 8:
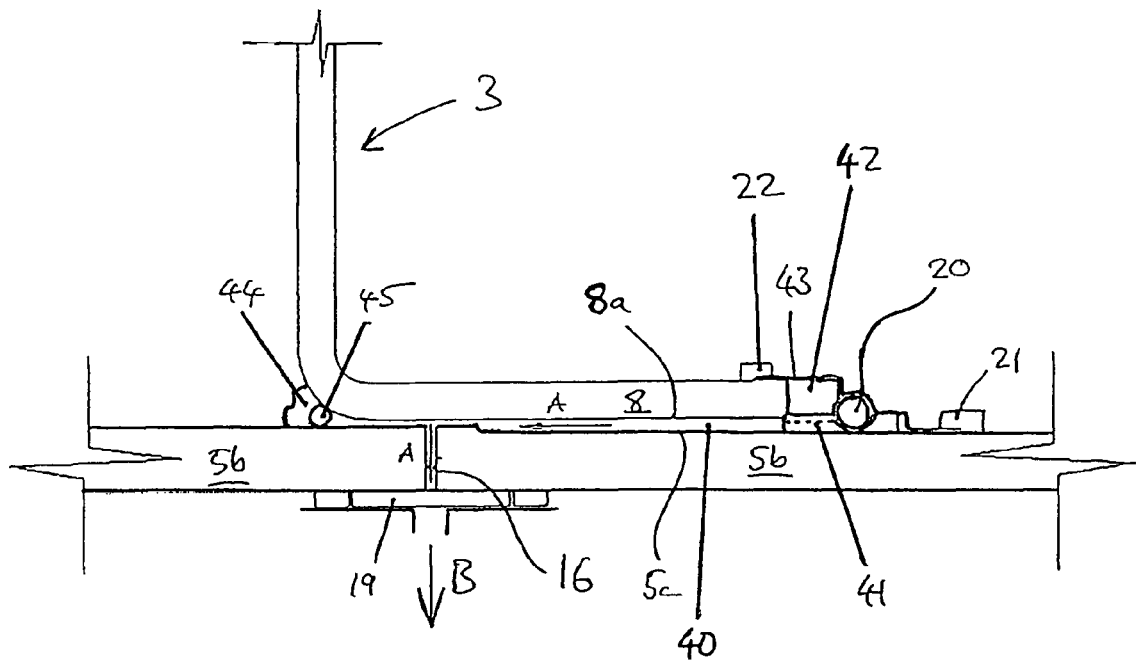
FIG. 8 is a cross-section of a spar flange and cover between which a shim is being formed in accordance with a second embodiment.

FIG. 8 shows schematically a cross section of a spar 3 and a cover which forms part of the wing skin 5b according to a second embodiment of the invention. The spar flange 8 is positioned on the wing skin 5b in order to enable a shim 6 (not shown in FIG. 8) to be formed in the gap or shim cavity 40 between the two aircraft components. Resin inlets in the form of a coil spring 20 which acts as a pipe are provided along the edge of the spar flange 8 in a manner similar to that described above in relation to the first embodiment. In this embodiment, however, a toothed belt 41 is additionally provided to improve the flow of resin. The belt 41 separates the inlet spring 20 and the spar flange 8 to provide channels that allow resin to pass into the shim cavity 40. A single strip of vacuum film 43 is used to seal the joins between the wing skin 5b, the inlet spring 20 and the spar flange 8. The vacuum film 43 is sealed at the edges to the spar 3 and the wing skin 5b by strips of tacky tape (bag tape) 21, 22. A packer 42 is provided on top of the toothed belt 41 to prevent a cavity being formed due to bridging of the vacuum film 43 between the spar flange 8 and the inlet spring 20. A pilot hole 16 in the wing shim 5b is covered on the opposite side to the spar flange 8 by a brake 19 in the form of a bleed pack. A source of vacuum (not shown) is connected directly to the brake 19, the suction causing flow of air (initially) in the direction of the arrow B. The gap between the spar flange 8 and the wing skin 5b is sealed at the edge, remote from the spring 20, by means of bag tape 44 and an 'O'-ring seal 45 which prevents the tape 44 from being drawn into the shim cavity 40 by the vacuum.

Prior to arranging the components in the manner as shown in FIG. 8, the spar flange 8 is treated with release agent (in this case a wax) to prevent the resin from adhering to the spar 3 and the wing skin 5b is treated by grit blasting to prepare a surface which will adhere well to the resin, once cured.

Figure 9:
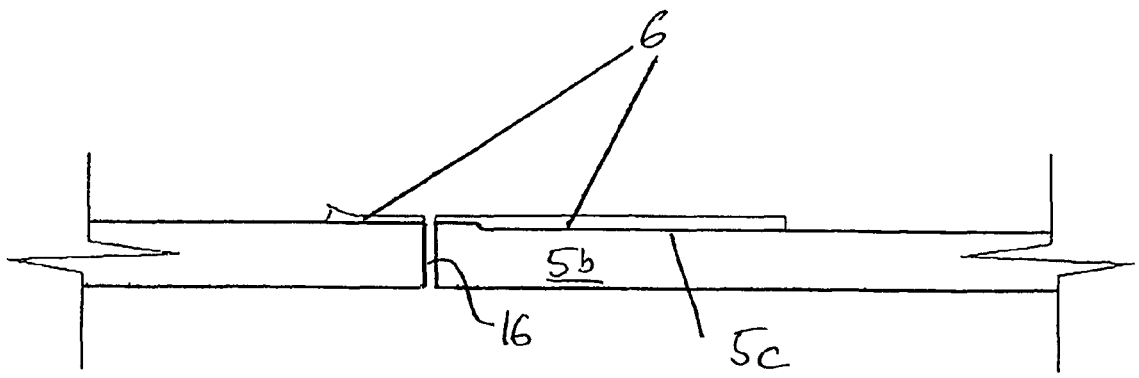
FIG. 9 is a cross-section of the cover shown in FIG. 8 after the shim has been formed.

In use, sealant flows from the spring 20 in the direction of the arrows A through the toothed belt 41 into the shim cavity 40 drawn by the vacuum from the direction of arrow B. Once the shim cavity is filled, any excess resin is drawn through the pilot hole 16 and to the brake 19. The resin is then left to cure to a shim 6. The spar 3 is then removed along with the consumables (i.e. the tacky tape 21, 22 and 44, the packer 42, the 'O'-ring 45 and the spring inlet 20) to leave behind the cured shim 6 adhered to the wing skin 5b as shown in FIG. 9.

The pilot hole 16 is then redrilled to remove any cured resin. Alternatively, the pilot hole 16 in the wing skin 5b may be back drilled prior to removal of the spar 3 to provide a hole through both the spar flange 8 and the wing skin 5b to accept fasteners to enable the wing skin 5b and the spar 3 to be fastened together.

Figure 10:
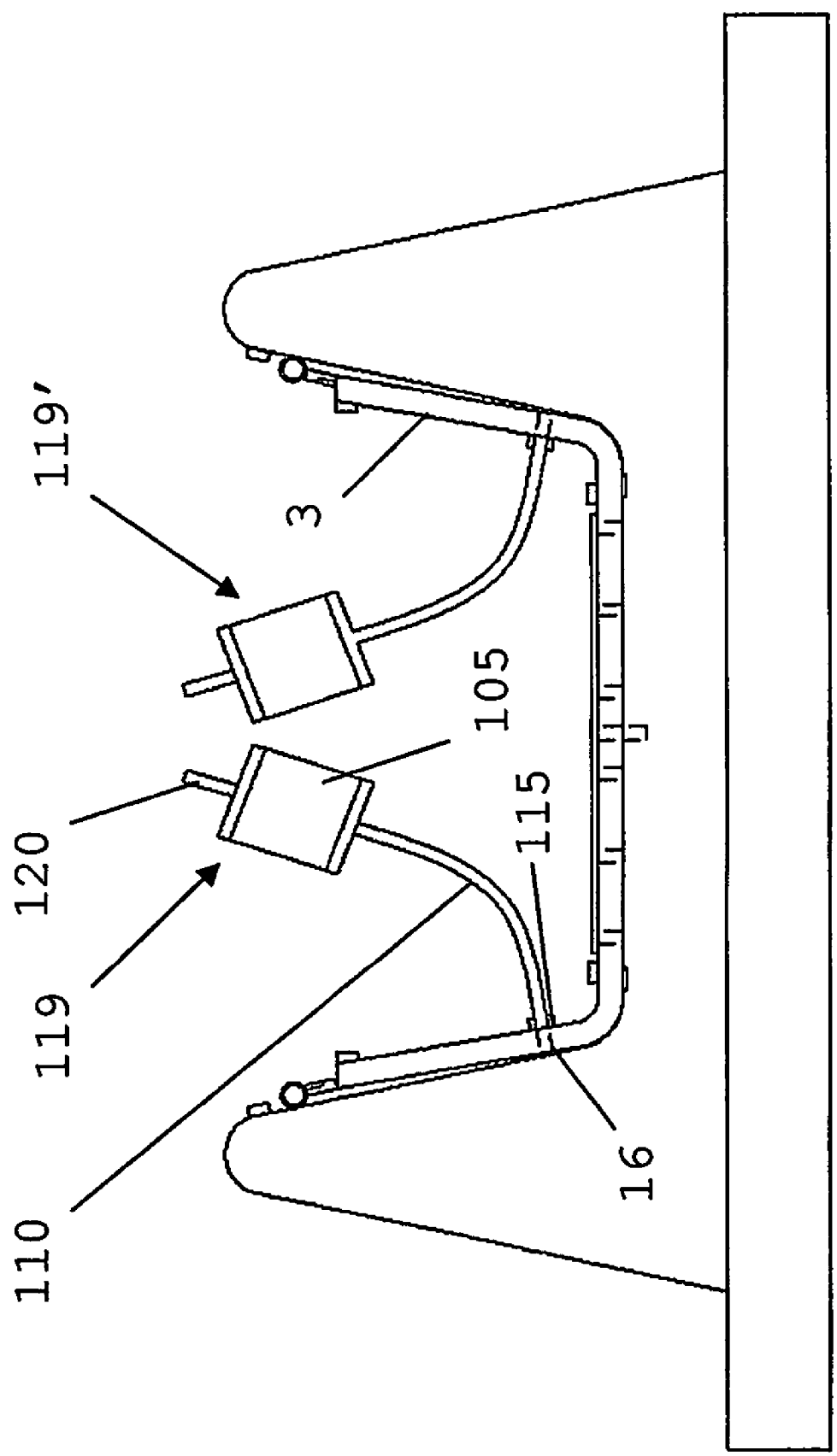
FIG. 10 shows a cross-section of the tool and spar, according to a third embodiment of the invention.
Figure 11:
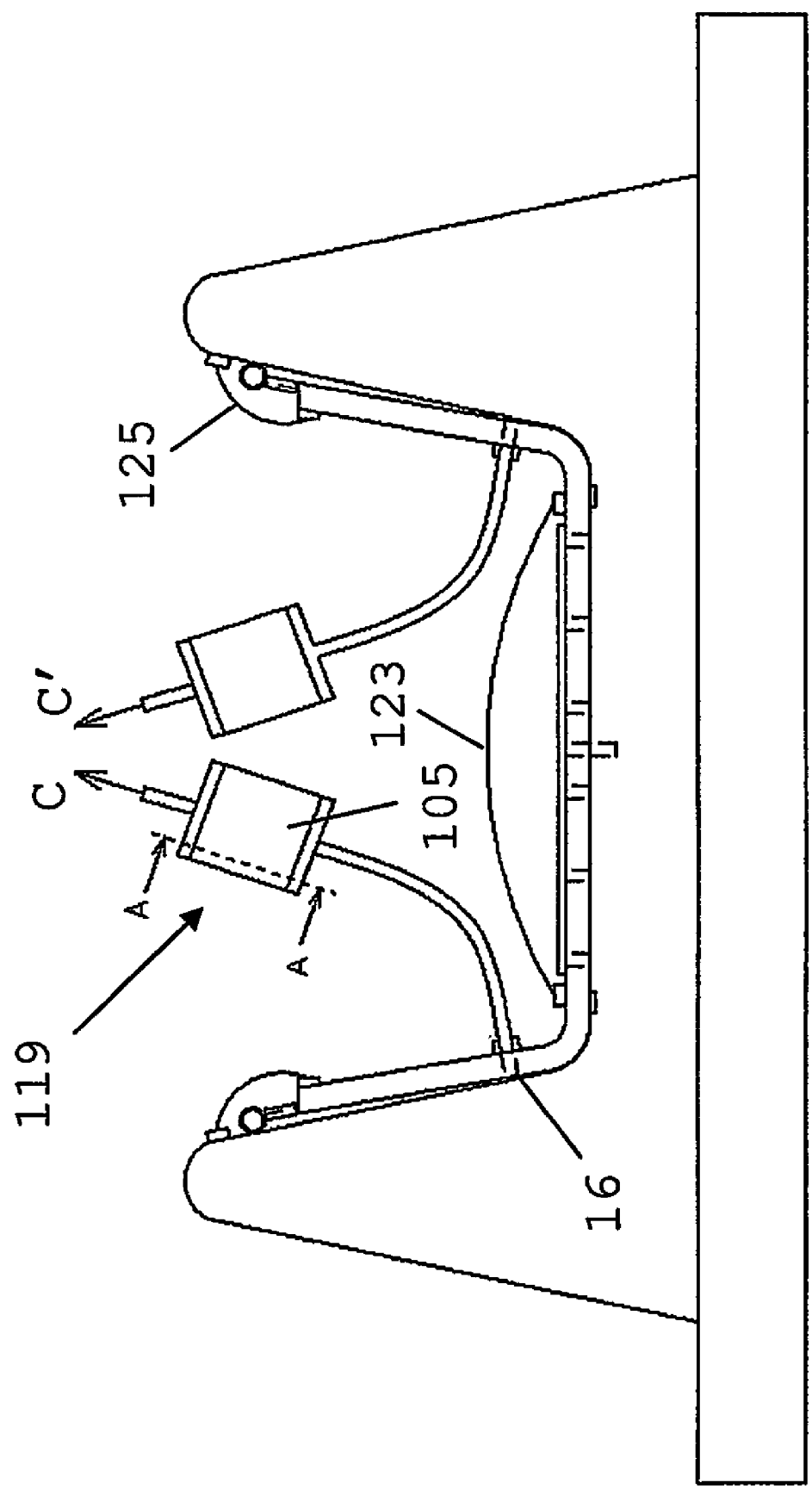
FIG. 11 shows a cross-section of the tool and spar of FIG. 10 during operation of the tool.
Figure 12:
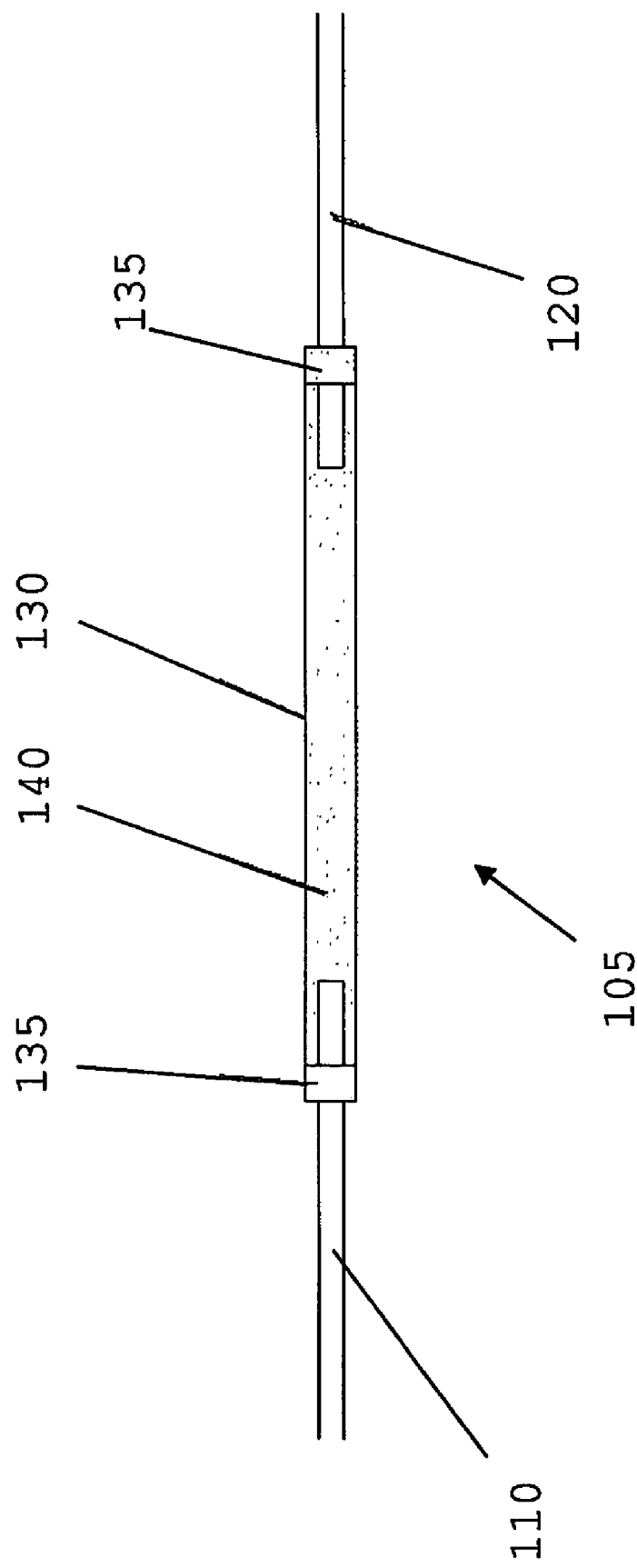
FIG. 12 is a section through the line A-A in FIG. 11.

In a further alternative arrangement (FIGS. 10 to 12), the brake 19 of the first embodiment is replaced by a brake (filter) arrangement 119 comprising a brake 105 that is separated from the surface of the spar 3 by a length of tubing 110. According to this third embodiment, tube 110 is attached by a connector 115 to pilot hole 16. Brake 105 is connected via further tubing 120 to a vacuum pump (not shown).

Brake 105 (FIG. 12) comprises a length of flat tubing 130, of a similar length to its width, containing a brake medium 140 sealed at each end by bag tape 135, through which tubes 110 and 120 pass.

In use (FIG. 11) vacuum bags 123, 125 are attached in places corresponding to bag sections 23, 25 in FIG. 7. Air flows through brake 119 initially in the direction of arrow C. Once the shim cavity is fitted, any excess resin is drawn through pilot hole 16 to the brake 105. The resin is then left to cure to a shim 6, as in the embodiment of FIG. 7.

Use of brake arrangement 119 rather than brake 19 reduces the amount of sealing required around the brake region to a very small amount around tube 110, connection 115 and pilot hole 16. That in turn enables the required level of vacuum to be achieved more easily.

Figure 13:
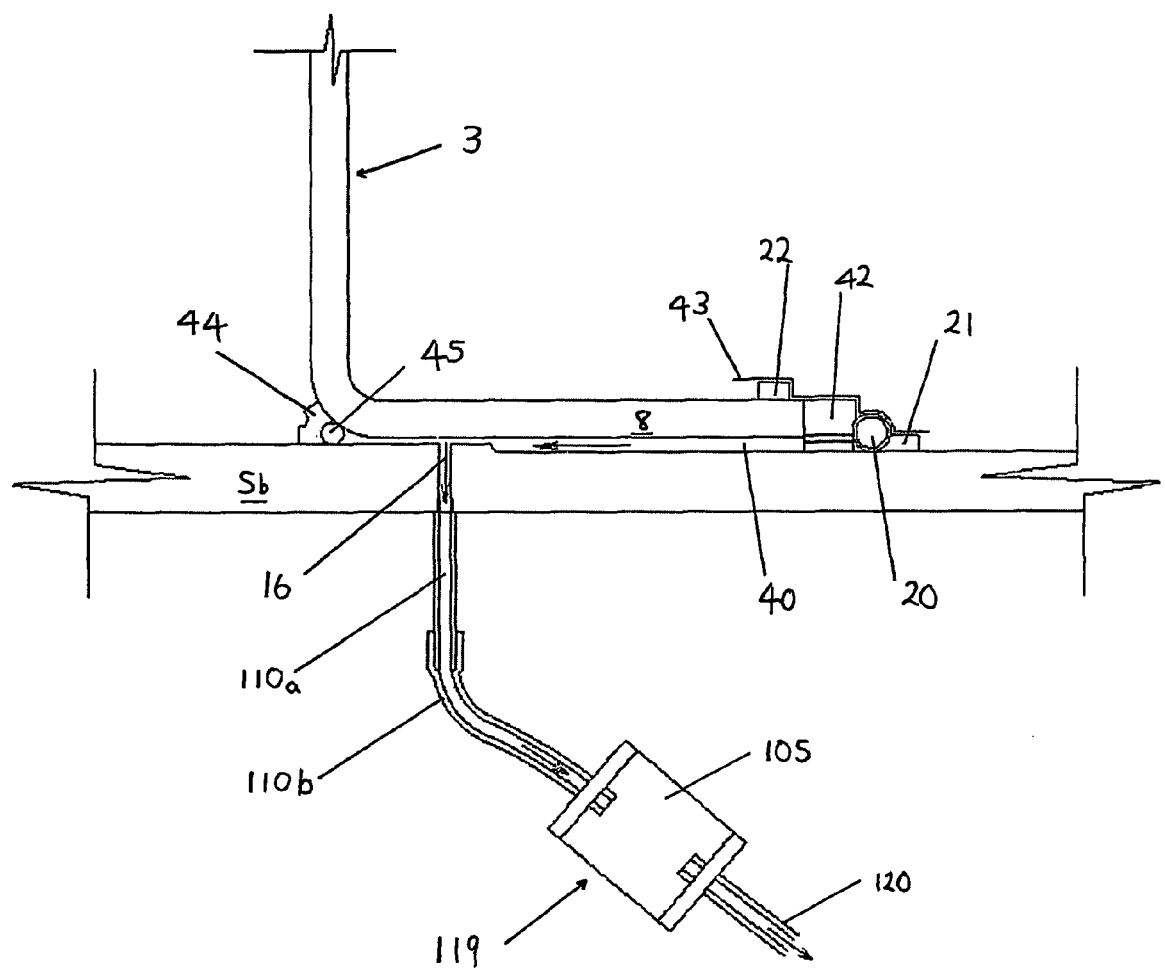
FIG. 13 is a cross-section of a spar flange and cover between which a shim is being formed in accordance with a fourth embodiment.

The brake arrangement 119 of the third embodiment can of course be used in the apparatus described with reference to the second embodiment. FIG. 13 shows schematically a cross-section of a spar 3 and a cover which forms part of the wing skin 5b according to a fourth embodiment of the invention. The embodiment illustrated in FIG. 13 is closely based on the second embodiment illustrated by FIG. 8 and the same reference numerals are used to designate the parts that are substantially identical in both embodiments. The brake arrangement shown in FIG. 8 is however replaced by a brake arrangement 119 similar to that illustrated in the third embodiment. Thus, the brake arrangement 119 comprises a brake 105 that is separated from the pilot hole 16 in the wing skin 5b by tubing comprising tubes 110a and 110b. The brake 105 is connected via further tubing 120 to a vacuum pump (not shown). The shim is formed in the shim cavity 40 in the same way as that described above with reference to FIG. 8. In this case the shim so formed becomes bonded to the cover (wing skin 5b). The surfaces of the spar flange 8 and wing skin 5b are treated accordingly prior to arrangement of the apparatus as shown in FIG. 13.

Figure 14:
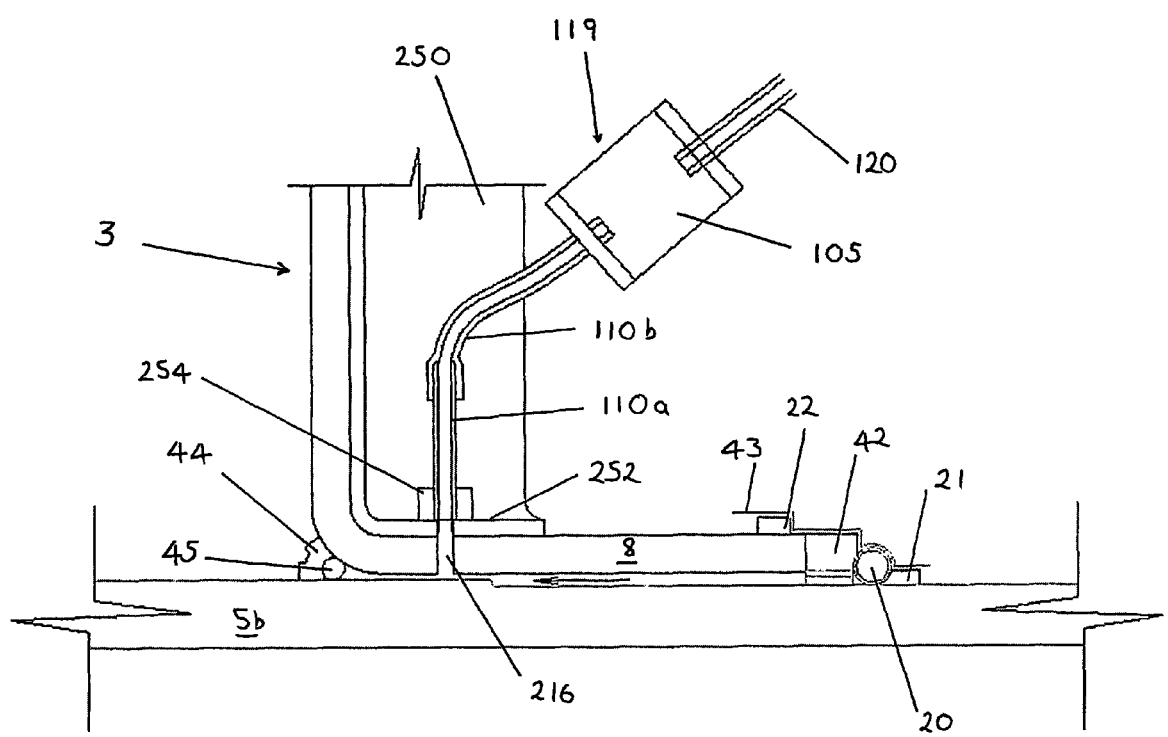
FIG. 14 is a cross-section of a spar flange and cover between which a shim is being formed in accordance with a fifth embodiment.

FIG. 14 shows an apparatus, according to a fifth embodiment of the invention, for forming a shim between a section of wing skin 5b and a spar 8. The spar 8 is connected to a rib post 250 including a rib post flange 252. This embodiment is similar to the fourth embodiment and the same reference numerals are used to indicate the parts that are identical. In this fifth embodiment however, the resin is drawn through a pilot hole 216 formed in the spar flange 8 and rib post flange 252 as opposed to drawing the resin through the wing skin 5b (or cover). The tube 110a between the pilot hole 216 and the brake 105 is secured with bag tape 254. In this case the shim so formed becomes bonded to the spar flange 8. The surfaces of the spar flange 8 and wing skin 5b are treated accordingly before assembly of the components as shown in FIG. 14.

As can be seen from FIGS. 13 and 14 the surface to which the shim, once formed, becomes bonded depends on the component through which the resin is drawn. Thus, if the resin is drawn through the wing skin then the shim becomes bonded to the wing skin, whereas if the resin is drawn through the spar flange then the shim becomes bonded to the spar flange. Which of the arrangements in FIGS. 13 and 14 are used will depend on assembly issues. As mentioned above, the surface to which the shim is to be bonded is roughened by grit blasting prior to formation of the shim, whereas the other surface is smoothed by treatment with release agent. For example, in FIG. 14 the spar flange is grit blasted and the wing skin (cover) is treated with release agent to enable the cured shim 6 to adhere to the spar and be released from the wing skin (cover).

It will be appreciated that various modifications may be made to the above described embodiments without departing from the spirit of the invention. For example, other resins can be used to create the shim. For example, a resin such as LY564/HY2954 (from Vantico Limited) could be used.

If a large gap is to be filled by the shim it may be beneficial to provide a fibre material mat or other solid shim in the gap before filling with resin.

Whilst one bag is used to apply the vacuum to the system of the first embodiment, several separate bags could be supplied. For example, one bag might be used to effect the fixing of the spar to the tool and further bags could be used to effect the flow of the resin into the gap between the spar flange and tool.

As opposed to using a coiled spring 20 as the resin inlet, a standard pipe with perforations or holes formed along its length could be used.

Further means can be implemented to improve flow of the resin into the gap between the spar flange and tool. For example, flow channels may be provided to guide the flow of resin from the inlet pipe into the gap. Such channels may be provided by an element running parallel to and along the length of the inlet pipe and could for example be in the form of a flat toothed belt (as described with reference to the second embodiment), the gaps between the teeth of the belt forming the resin flow channels. Also the resin could be supplied under pressure.

A tool may of course be made to suit any size or shape of spar or other aircraft component. Tools of different shapes may be made to form shims for aircraft components other than wing spars. The tool could of course be made of any suitable material able to be machined to provide a surface of a pre-determined shape to within a relatively small tolerance (such as less than 0.2 mm).

The invention claimed is:

1. A method of enabling two aircraft components to be joined together, said method including the steps of providing a first aircraft component and a second aircraft component, the first aircraft component having a surface to be joined to a corresponding surface of said second aircraft component, said first and second components being so shaped that if joined there would be a space defined between said surfaces of said first and second components, providing a resin infusion system comprising a source of resin, said resin infusion system comprising a moulding tool, the moulding tool being distinct from the second aircraft component and having a surface for arrangement against said first aircraft component, said surface of the moulding tool being shaped to correspond to said surface of said second aircraft component such that, when said surface of said moulding tool is arranged against said first aircraft component, a gap is present between the surface of the moulding tool and the first aircraft component, arranging said moulding tool surface against said first aircraft component such that said gap is formed between said moulding tool surface and said first aircraft component, effecting flow of said resin from said source of resin into said gap between said moulding tool surface and said first aircraft component by means of suction, thereby substantially filling said gap with resin, the flow of the resin out of the gap is restricted by means of a barrier and at least a part of the barrier is formed by said moulding tool;

curing said resin to form a shim on said first aircraft component, and removing from the moulding tool the said first aircraft component bearing said shim.

2. A method according to claim 1, wherein said barrier is, during the filling of said gap with resin, removably fixed in position relative to said first aircraft component.

3. A method according to claim 2, wherein said barrier is fixed to said first aircraft component by means of a pressure difference.

4. A method according to claim 3, wherein a single vacuum pump is used both to cause said pressure difference and to provide the suction that draws said resin into said gap.

5. A method according to claim 1, wherein a surface of said first aircraft component is prepared so that adherence of said resin to said surface of said first aircraft component is improved, a surface of said barrier is prepared so that the adherence of the resin to said surface of said barrier is reduced to facilitate separation of said barrier from said resin once cured.

6. A method according to claim 1, wherein the method includes a step of joining said second aircraft component to said first aircraft component, after said resin has cured.

7. A method according to claim 1, wherein a filter is provided to hinder flow of said resin out of said gap.

8. A method according to claim 1, wherein said first aircraft component includes at least one aperture arranged so that the suction is provided via said at least one aperture.

9. A method according to claim 8, wherein said resin enters said aperture, and the method includes a step of remachining said aperture after said resin has cured.

10. A method according claim 1, wherein the curing of said resin is effected by cold curing.

11. A method according to claim 1, wherein said first aircraft component is formed of a composite material.

12. A method of joining two aircraft components together, said method including the steps of
providing a first aircraft component and a second aircraft component, the first and second aircraft component being formed of a composite material, said first aircraft component having a surface to be joined to a corresponding surface of said second aircraft component formed of a composite material, said first and second components being so shaped that if joined there would be a space defined between said surfaces of said first and second components,
providing a resin infusion system comprising a source of resin, the resin infusion system comprising a moulding tool, the moulding tool being distinct from the second aircraft component and having a surface for arrangement against said first aircraft component, said surface of the moulding tool being shaped to correspond to said surface of said second aircraft component such that, when said surface of said moulding tool is arranged against said first aircraft component, a gap is present between the surface of the moulding tool and the first aircraft component,
arranging said moulding tool surface against said first aircraft component such that said gap is formed between said moulding tool surface and said first aircraft component,
effecting flow of said resin from said source of resin into said gap by means of suction, thereby substantially filling said gap with resin, the flow of the resin out of the gap being restricted by means of a barrier, at least a part of said barrier being formed by said moulding tool, and said moulding tool and said first aircraft component being, during the filling of said gap, removably fixed in position relative to each other by means of a pressure difference,
curing said resin whilst between said first aircraft component and said moulding tool so as to form a shim on said first aircraft component,
separating said first aircraft component and said moulding tool after said resin has cured, and
joining said second aircraft component to said first aircraft component and said shim.

13. A method according to claim 1, wherein the moulding tool is mounted on a supporting base.

14. A method according to claim 1, wherein the moulding tool is provided with a locating element that engages with a corresponding element on the first aircraft component.

15. A method according to claim 1, wherein the moulding tool is made from polyurethane or epoxy.

16. A method according to claim 1, wherein the resin is heated prior to it being drawn into the gap between the moulding tool and the first aircraft component.

* * * * *